United States Patent [19]
Fortune

[11] 3,854,352
[45] Dec. 17, 1974

[54] PNEUMATICALLY-CONTROLLED LATHE SYSTEM

[76] Inventor: William S. Fortune, 14250 Dearborn St., Panorama City, Calif. 91402

[22] Filed: June 6, 1973

[21] Appl. No.: 367,582

[52] U.S. Cl. .................. 82/21 A, 82/2.5, 82/14 A
[51] Int. Cl. ..... B23b 21/00, B23b 13/00, B23b 3/28
[58] Field of Search ....... 82/2.5, 14, 14 A, 21, 21 A

[56] References Cited
UNITED STATES PATENTS

| | | | |
|---|---|---|---|
| 2,372,427 | 3/1945 | Johnson | 82/14 A |
| 2,634,644 | 4/1953 | Johnson | 82/14 A |
| 3,043,278 | 7/1962 | Ackerman | 82/21 AX |
| 3,107,581 | 10/1963 | Ackerman | 82/21 AX |
| 3,212,372 | 10/1965 | Knox, Jr. | 82/21 A |
| 3,447,220 | 6/1969 | Hicks et al. | 82/21 A |
| 3,481,231 | 12/1969 | Cormier | 82/21 A |
| 3,550,503 | 12/1970 | Pallay | 82/2.5 |

*Primary Examiner*—Harrison L. Hinson
*Attorney, Agent, or Firm*—Daniel T. Anderson

[57] ABSTRACT

A system for automatically controlling a lathe, particularly a turret lathe, by fluid pressure such as air pressure. All movable parts such, for example, as the crossfeed table and the turret ram table of the lathe, are actuated by an air-operated piston. Sensors such as air-operated poppet valves are provided for sensing when the movable part has reached either one of its extreme or end positions. A liquid-operated damper is disposed in the path of the movable part for slowing down its movement between a predetermined point and its end position. This permits to move the table at high speed until the tool engages the work, whereupon the speed can be controllably reduced. This may be effected by controlling an adjustable opening of a valve in the path of the liquid of the damper.

7 Claims, 12 Drawing Figures

PATENTED DEC 17 1974 3,854,352

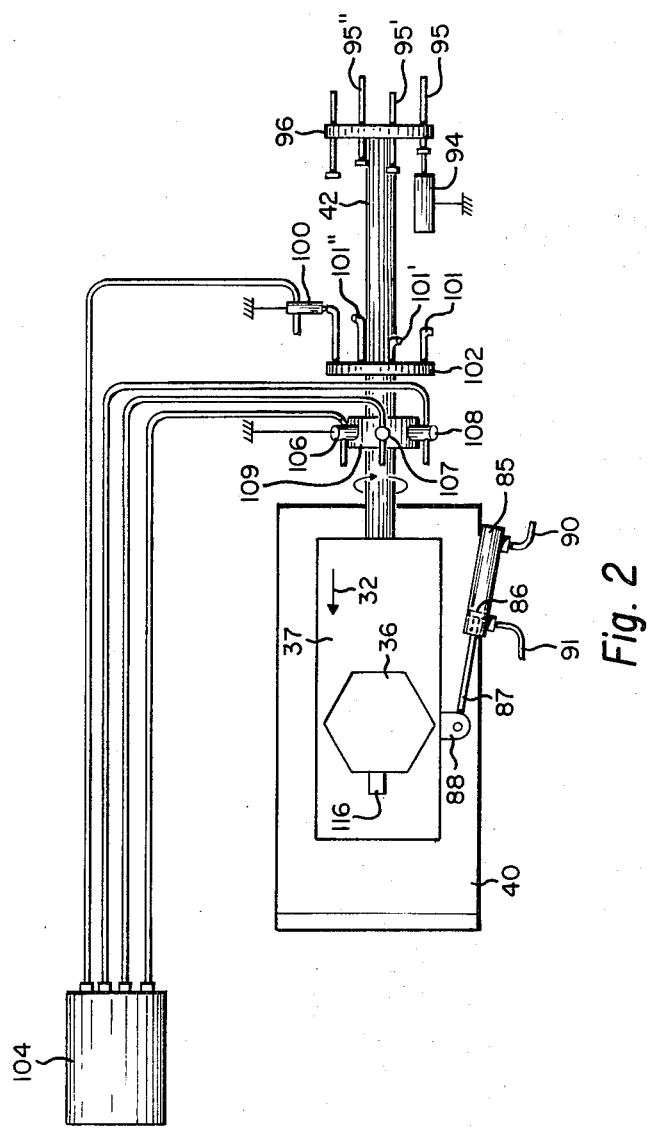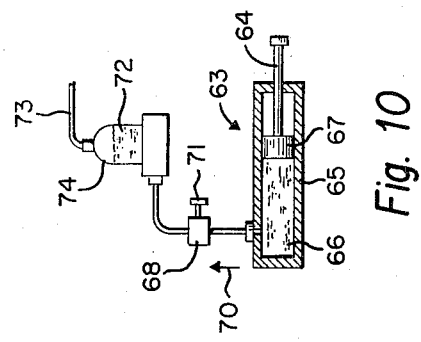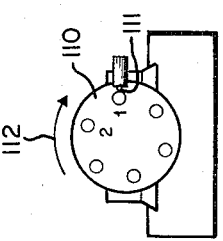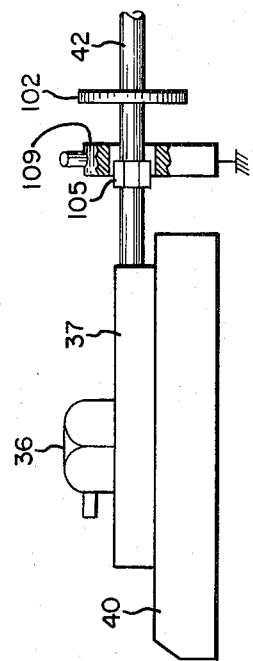

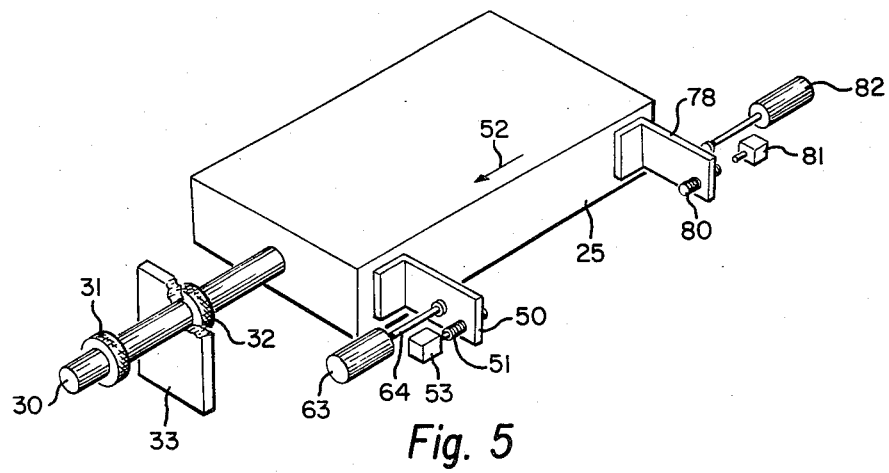
Fig. 5
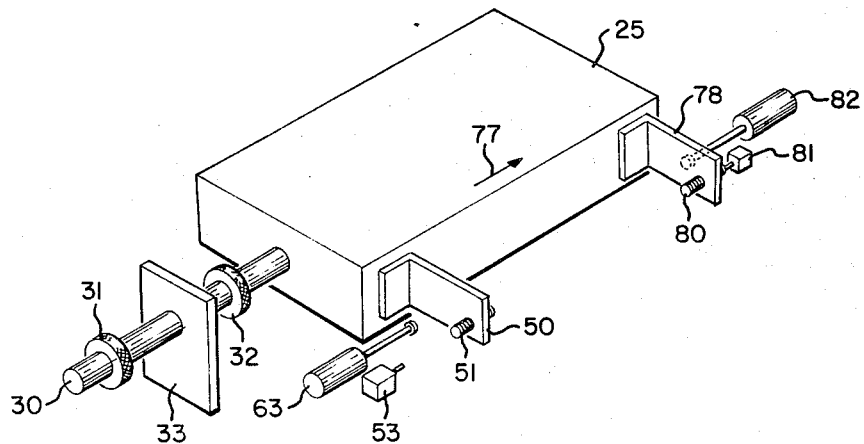
Fig. 6
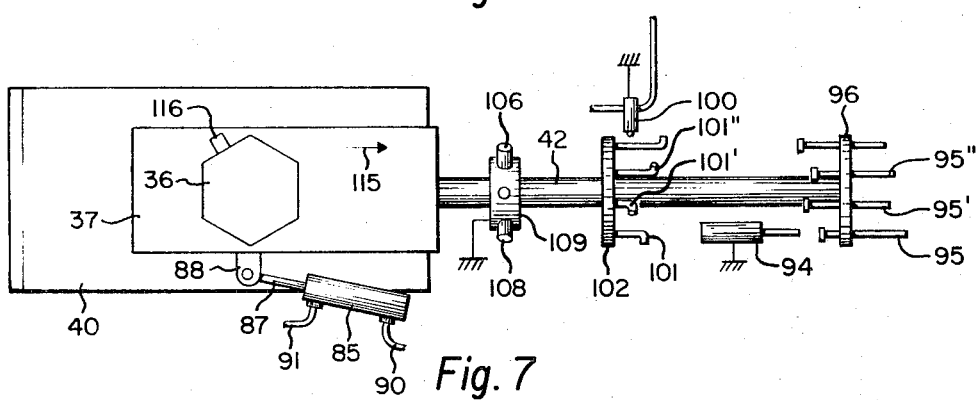
Fig. 7
Fig. 8
Fig. 9

3,854,352

PNEUMATICALLY-CONTROLLED LATHE SYSTEM

BACKGROUND OF THE INVENTION

This invention relates generally to automatically controlled lathes and particularly relates to an air-controlled system for an automatic turret lathe.

Automatic lathes are well known in the art. They are used for machining accurately parts in large numbers. They have the advantage that the finished parts have uniform dimensions and can be manufactured rapidly.

The advantages of automation have long been recognized. Primarily, they provide high volume production and low cost per part, in part because the requirements for skilled manpower are at a minimum. Automation is the rule in the plastic industry. However, automated lathes are extremely expensive.

It has been proposed in the past to control and program a lathe by means of electronically controlled electric motors. However, such a system requires electric timers and relays which must be adjusted and maintained periodically. Additionally, movable parts of the lathe must be lubricated and the tools or the work must be cooled by a suitable coolant. This in turn may contaminate the electric parts and cause malfunctions of drive motors or switches. Frequency, the sensors used are photoelectric and they may be obscured or rendered inoperative by oil or coolant. Finally, the linkages between the motors and the movable parts have to be carefully machined and adjusted to keep play at a minimum. Such play may cause tool chatter and reduce the accuracy with which parts may be manufactured.

It is accordingly an object of the present invention to provide a pneumatic system for automatically controlling a lathe such as a turret lathe which requires only readily available parts.

A further object of the present invention is to provide a lathe control system which is safer than electronic systems because the use of electric current is avoided, thereby eliminating the explosion hazard in a flamable environment.

Still another object of the present invention is to provide a pneumatic system of the type disclosed which is easy to adjust and requires a minimum of maintenance.

SUMMARY OF THE INVENTION

In accordance with the present invention there is provided a fluid controlled system for an automatic lathe having a movable part. The system comprises fluidoperated means connected between a fixed part and the movable part for moving the part from one extreme position to the other. Preferably, the means is operated by air. Furthermore, two sensors are provided, each being disposed to sense when the part has reached one of its extreme positions. There is also provided fluid operated damping means disposed in the path of the movable part. The damping means is preferably liquid operated and serves the purpose to slow down the movement of the movable part between a predetermined point and its extreme position. Furthermore, this permits to slow down the speed of the part, for example, at the instant when a tool begins to engage the work. Finally, fluid-controlled means are provided which are responsive to the sensors for controlling the fluid-operated means. In other words the sensors control the direction of movement of the movable part.

By way of example, the sensors may consist each of an air-operated poppet valve which permits flow of air through the valve when the sensor is actuated. This will generate a positive air pressure signal.

The novel features that are considered characteristic of this invention are set forth with particularity in the appended claims. The invention itself, however, both as to its organization and method of operation, as well as additional objects and advantages thereof, will best be understood from the following description when read in connection with the accompanying drawings.

BRIEF DESCRIPTION OF THE DRAWINGS

FIG. 2 is a top plan view of the lathe turret with its turret ram table and including a turret indexing shaft with sensors for sensing the longitudinal position of the turret ram table, as well as the index position of the turret and a damper for controlling the motion of the turret ram bed;

FIG. 3 is a said elevational view of the turret and turret ram table of FIG. 2 and showing an indexing cam attached to the turret indexing shaft;

FIG. 4 is a sectional view showing the turret in one of its indexing positions with a retaining latch;

FIG. 5 is a view in perspective of the crossfeed table in one of its extreme positions and including sensors and dampers for sensing the extreme positions of the table and reducing its speed;

FIG. 6 is a view in perspective similar to that of FIG. 5 but illustrating the crossfeed table as it moves from the first extreme position to the other;

FIG. 7 is a top plan view of the turret and turret ram table similar to that of FIG. 2 but showing the ram table moving into its other or right-hand extreme position;

FIG. 8 is a side elevational view similar to that of FIG. 3 and again showing the turret ram table in its right-hand position;

FIG. 9 is a sectional view similar to that of FIG. 4 and illustrating the turret in its next index position;

FIG. 10 is a sectional view of a damper including a piston and control valve for controlling the speed of movement of the damper's piston;

DESCRIPTION OF THE PREFERRED EMBODIMENT

Referring now to FIGS. 1–4 there is illustrated an exemplary embodiment of the present invention. The pneumatic control system of the invention is shown applied to an automatic turret lathe. It will however be understood that the control system of the invention may be used equally well with any automatic lathe having movable parts.

Figure 1:
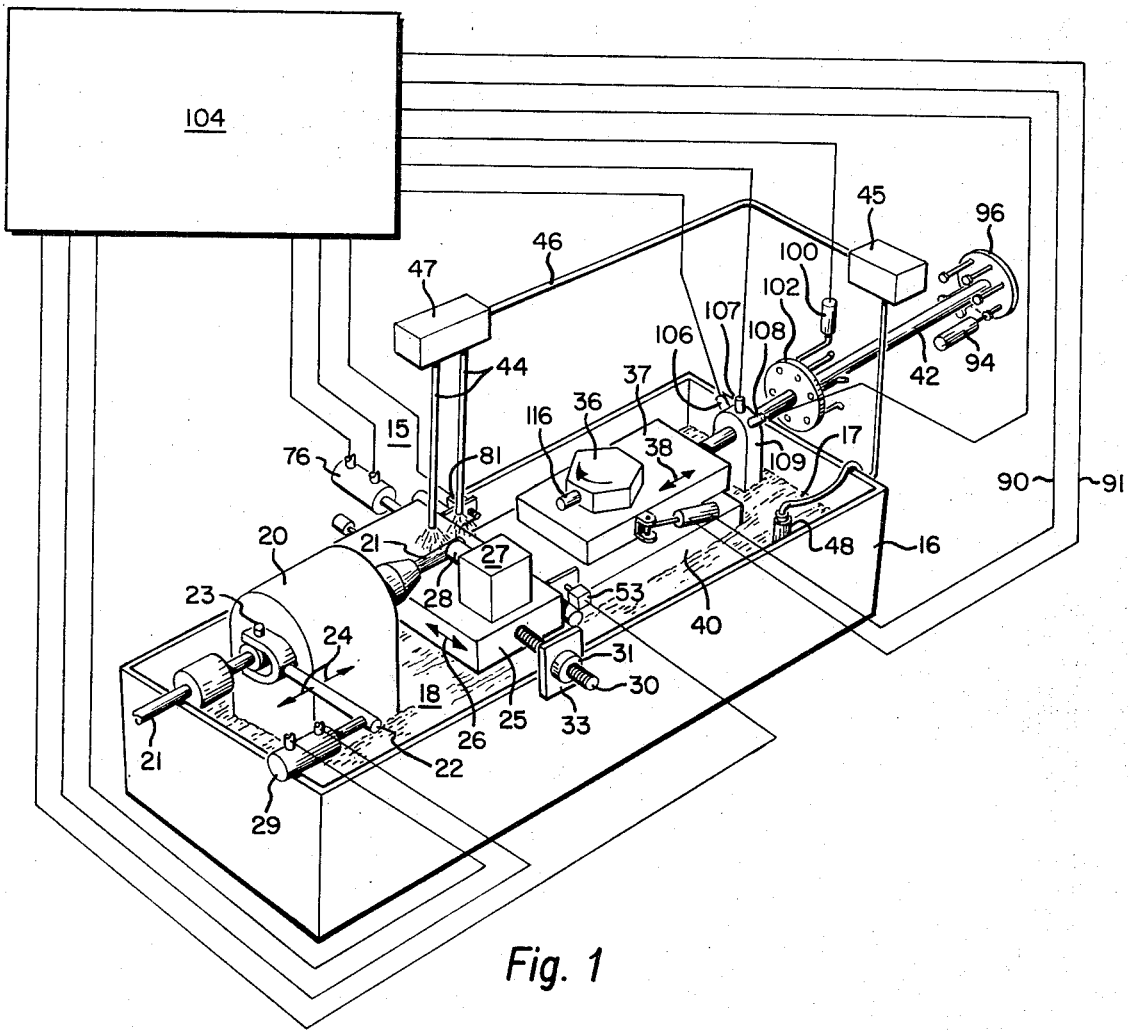
FIG. 1 is a view in perspective of an automatic turret lathe pneumatically controlled in accordance with the present invention.

As shown particularly in FIG. 1, the turret lathe generally indicated at 15 includes a lathe bed 16 provided with a well 17 for receiving, for example, a suitable coolant or oil shown at 18. The lathe includes a collet housing 20 for housing a collet, the purpose of which is to clamp and rotate the work 21 which may, for example, consist of a rod of metal or plastic material. A fork shaped lever 22 pivoted at 23 serves the purpose to actuate the collet, that is to open and to close it upon reciprocal motion in the directions shown by arrow 24. The lever 22 is activated by an air cylinder 29 having one end fixed to the lathe bed 16 and the other end attached to the lever 22.

The lathe is further provided with a crossfeed table 25 arranged to reciprocate in the directions shown by arrow 26 across the lathe bed 16. The crossfeed table 25 is provided with a fixture 27 upon which may be mounted a suitable cutting tool such as shown at 28. Attached to the crossfeed table 25 is a screw 30 upon which may be mounted two knurled nuts 31 and 32 (shown particularly in FIGS. 5 and 6). The nuts 31 and 32 may be adjsuted to provide stops for the motion of the crossfeed table 26 when they engage a bracket 33 fixed to the lathe bed 16. The manner in which the crossfeed table 21 is controlled will be subsequently explained in connection with FIGS. 5 and 6.

The turret lathe also has an indexable turret 36 which may, for example, have six faces as shown. Various cutting tools may be mounted in each of the six turret faces and sequentially indexed into position to perform various operations. Alternatively, one of the faces may be designed to receive the work after it has been cut off by one of the cutting tools on the fixture 27 of the crossfeed table.

The turret 36 is mounted on a turret ram table 37 capable of reciprocating as shown by arrow 38 in the longitudinal direction of the turret bed 16. The turret ram table 37 may be mounted on a raised, fixed portion 40 which may, for example, house the indexing mechanism. The turret is automatically indexed as it is moved form one extreme position to the other by means of a pin and rachet mechanism in the turret box.

The turret is further provided with a turret indexing shaft 42 which rotates through a predetermined angle every time the turret indexes. Thus, if the turret has six faces, the indexing shaft 42 rotates through 60° every time the turret is indexed to another position.

A coolant may be distributed by one or more pipes 44 onto the area where the work is being cut. This coolant or cutting oil may be pumped by a coolant pump 45 through a conduit 46 to a distributor 47. The coolant may simply be permitted to collect in the well 17 and may be removed by a coolant sump 48 having a conduit to the pump 45.

It should be noted that the only electric power required in the system of the invention is the power for the coolant feed pump 45 and for indexing the turret and rotating the collet. This will minimize the danger of explosion in a flamable environment.

The manner in which the crossfeed table 25 is controlled and moved will not be explained by reference to FIGS. 5 and 6.

Mounted on the crossfeed table 25 there is a bracket 50 which may bear an adjustable screw 51. Eventually as the table moves in the direction of arrow 52 (to the left of FIG. 5), the screw 51 will engage a fixed sensor 53. The sensor 53 preferably is air operated and may take the form of the poppet valve 54 shown in FIGS. 11 and 12. The poppet valve 54 has air inlet and outlet channels 55 disposed in the housing 56. A spherical-ended sensing rod 57 extends from the housing 56 and is loaded by a spring 58 so that its air channel 60 is normally prevented from registering with the inlets and outlets 55. However, when the feeler 57 of the valve engages a movable part such as shown at 61, it will be lefted against the pressure of the spring 58 so that air can now flow through the inlet and outlet ports 55 and the channel 60 in the movable part of the valve which are now in register. This will now produce an air pressure signal, that is a positive signal. Such poppet valves are available in the trade. It will, however, be understood that other sensors may be used instead.

There is also provided a fixed damper 63 having a rod 64 which engages the bracket 50 when the crossfeed table moves in the direction of arrow 52. This will slow down the motion of the crossfeed table from a first predetermined point to its extreme left-hand position as viewed in FIG. 5. The purpose is to slow down the motion of the crossfeed table when the tool on the crossfeed fixture is about to engage the work.

The damper 63 may take the form shown in FIG. 10. It is provided with a housing 65 containing a liquid 66 to operate the piston 67 and hence the rod 64. The liquid may flow through a valve 68 having a restricted opening to slow down motion of the liquid in the direction of arrow 70. This restriction is controllable by an adjustable nut 71 which increases or decreases the size of the opening. The liquid then flows through a suitable conduit to the liquid reservoir 72. The valve 68 is so arranged that it provides no resistance to the flow of the liquid in the opposite direction so that the rod 64 can be rapidly pushed back toward the right of FIG. 10. This may, for example, be effected by air pressure supplied through conduit 73 to the top portion 74 of the fluid reservoir 72. However, it will be understood that other dampers may be used instead, the one of FIG. 10 being shown by way of example only.

Thus, the motion of the crossfeed table 25 is slowed down by the damper 63 until eventually the nut 32 engages the bracket 33 to provide a stop. The crossfeed table is moved in opposite directions by means of an airoperated piston 76 which may be fixed to the lathe bed 16 and attached to the table so as to be capable of moving the crossfeed table 25 in either direction.

When the sensor 53 has sensed that the crossfeed table 52 has reached its extreme position, the motion of the crossfeed table is stopped usually just before the nut 32 engages the bracket 33 by reversing the air flow to the air cylinder 76. This is effected by a pneumatic logic control system which will be explained subsequently in connection with FIGS. 2 – 4.

It will now be assumed that the crossfeed table 25 moves in the opposite direction as shown by arrow 77 of FIG. 6. The crossfeed table 25 is provided with a second bracket 78 through which extends an adjustable screw 80 which cooperates with a fixed sensor 81 and a damper 82. The damper 82 will first engage the bracket 78 to slow down motion of the crossfeed table. Eventually when the table has reached its extreme right-hand position the sensor 81 actuated thereby causes a reversal of the air flow in the two-way air cylinder 76. Eventually, the nut 31 will engage the fixed bracket 33 to serve as a stop.

The operation and control of the turret ram table 37 will now be explained in connection with FIGS. 2 – 4 and to FIGS. 7 – 9 to which reference is now made. The turret ram table 36 is moved to and fro by an air cylinder 85 which may operate like air cylinder 76 or 29 previously described. It includes a piston 86 for reciprocating the rod 87 which is linked by a bracket 88 to the turret ram tabe 37 to move it back and forth. The motion is controlled by supplying air either to air inlet 90 or inlet 91. If the turret ram table 37 moves in the direction of arrow 32, that is in the left-hand direction as viewed in FIG. 2, air will be supplied to the inlet 90 to extend the rod 87.

In order to slow down the motion of the turret ram table 37 toward the left there is provided a damper 94 which may be similar to the damper 63 previously described. As shown schematically, the damper 94 is fixed with respect to the movable turret ram table 37. By way of example the damper 94 may be attached to the lathe bed 16. It engages an adjustable screw 95 disposed on a disk 96 fixed to the turret indexing shaft 42. There may be provided a plurality of adjustable screws such as shown at 95', 95'', etc., one for each indexable position of the turret 36. Each of the screws 95, 95', 95''is adjustable because the associated tool may have a shorter or longer path until it engages the work.

The extreme left-hand position of the turret ram table 37 may be sensed by a sensor 100 which may be fixed as shown. The sensor 100 may also be secured to the lathe bed 16. It engages one of a plurality of adjustable elements 101, 101', 101''which form adjustable turret stops. They may consist of screws and are adjustably secured to a disk 102 fixed on the turret indexing shaft 42.

Figure 11:
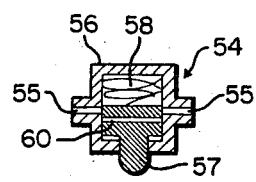
FIG. 11 is a sectional view of an air-operated poppet valve serving as a sensor in its closed position.
Figure 12:
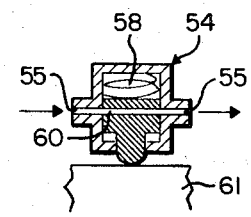
FIG. 12 is a sectional view of the poppet valve of FIG. 11 in its actuated position.

Again the sensor 100 may take the form shown in FIGS. 11 and 12. The sensor 100 may be connected to an air logic and programmer 104 which controls in turn the air cylinder 85 or the air cylinders 76 or 29 shown in FIG. 1. The pneumatic control system is available on the market and may make use of air logic, including AND and NOR circuits as well as timers or time delay means. Such a system may operate on positive pressure signals (supplied by a set of poppet valves such as shown in FIGS. 11 and 12) and is therefore called a pressure state system. As indicated it may make use of binary logic to simplify the design of the system and to minimize the number of components. However, as indicated, such systems are conventional and are freely available on the market and hence a further description is not deemed to be necessary here.

Suffice it to say that the air sensor 100 by means of the programmer 104 causes a reversal of the air flow to the air cylinder 85, hence reversing the movement of the turret ram table 37.

It is also necessary to sense the particular rotationally indexed position of the turret 36. This may, for example, be accomplished by disposing a suitable turret position cam 105 on the turret indexing shaft 42. The cam 105 has high and low portions designed to cooperate with say three air sensors 106, 107 and 108. These three sensors 106, 107 and 108 are mounted on a sleeve 109 surrounding the turret indexing shaft 42 and secured in turn to the lathe bed 16. These three air sensors are closed or actuated by the cam 105 to provide logic signals to the programmer 104 to inform the panel of the particular position to which the turret 36 has now been indexed. It will be realized that three sensors are necessary to generate a binary signal indicative of one of the six positions of the turret. Thus as shown in FIG. 4, a disk 110 connected to the turret 36 has been indexed into position one and has been locked by a locking pin or latch 111 which engages detents (not shown) in the disk 110. The turret ram table now moves during its next indexing cycle in the direction of arrow 112. This automatically takes place when the turret moves from its extreme left-hand position into its extreme right-hand position which is shown in FIGS. 7 – 9.

It will be understood that the collet control air cylinder 29, the crossfeed control cylinder 76, and the turret ram table control cylinder 85 are all controlled by the programmer 104. The programmer 104 in turn is supplied with signals by the respective sensors such as 53 and 81 for the position of the crossfeed table 25, sensor 100 for the position of the turret ram table 37 and sensors 106 – 108 for the indexed position of the turret 36.

As illustrated particularly in FIG. 7, the turret ram table 37 is moving in the direction of arrow 115, that is toward the right. For this reason damper 94 is out of engagement with its associated stop 95. Also sensor 100 is out of engagement with its associated forward turret stop 101. It will also be noted that the rod 87 is in its retracted position.

When the turret ram table 37 has reached its extreme right-hand position the turret and its tool shown at 116 have been indexed into position two as shown in FIG. 9 from position one and has been locked by the locking pin 111.

There has thus been disclosed a pneumatic system for controlling an automatic lathe such as a turret lathe. Since the control system does not require electric power the danger of explosion is minimized and it is possible to utilize the well in the turret bed as a sump for the cooling fluid. Because mechanical linkages and gears are eliminated the play of the movable parts are minimized with an increase of accuracy of the machined parts and with a minimum of tool chatter. The movement of the controlled part can be slowed down and the reduction in speed is easily adjustable by a simple adjustment valve. Since air pressure is available in most machine shops the control may be readily installed and can operate with air pressure as low as 40 lbs/sq. inch. The system can be used world wide as distinguished from electric systems where differences in voltages and frequency are encountered in different countries. The components required for the system are readily available, and adjustment and maintenance is easy.

I claim:

1. A gas-controlled system for an automatic turret lathe having a crossfeed table and a turret ram table, said system comprising:
    a. a cylinder having a gas-operated piston connected between a fixed part and one of said tables for moving said table from one end position to the other;
    b. two fixed gas-operated sensors disposed to sense when said one of said tables is at each of its end positions for developing respective position signals;
    c. two liquid-operated dampers fixed with respect to and cooperating with said one of said tables for slowing down the movement of said table from a predetermined position during its travel in each direction; and
    d. gas-controlled means responsive to said position signals for controlling gas flow to said cylinder.

2. A system as defined in claim 1 wherein each of said sensors consists of a poppet valve for controlling air flow therethrough in response to said sensor being actuated, whereby said position signal is an air pressure signal.

3. A pneumatically controlled system for an automatic turret lathe having a reciprocable crossfeed table and a reciprocable turret ram table, siad system comprising:
   a. a first cylinder having a gas-operated piston connected between a fixed part and said turret ram table;
   b. a second cylinder having a gas-operated piston connected between a fixed part and said turret ram table;
   c. a first pair of sensors being fixed with respect to said crossfeed table for sensing each of the extreme positions of said crossfeed table;
   d. at least one further sensor for sensing the forward position of said turrret ram table;
   e. a first pair of liquid-operated dampers cooperating with said crossfeed table for slowing down the motion of said crossfeed table between each of two predetermined positions and an associated end position; and
   f. at least one additional liquid-operated damper cooperating with said turret ram table for slowing down its forward movement from a predetermined position to its forward end position.

4. A system as defined in claim 3 wherein air-operated means are provided for controlling air flow to each of said cylinders in response to signals received from said sensors.

5. A system as defined in claim 4 wherein each of said sensors consists of a poppet valve for permitting the passage of air upon actuation thereof, thereby to provide an air pressure signal.

6. A system as defined in claim 4 wherein said automatic turret lathe is provided with a turret indexing shaft rotatable from one position to another upon indexing of the turret, and a stop for each position of said turret indexing shaft cooperting with its associated damper to control the damping position of said turret ram table separately for each index position.

7. A system as defined in claim 6 wherein a cam is provided on said turret indexing shaft and three additional fixed sensors cooperating with said cam for sensing each particular indexing position of said indexing shaft.

* * * * *